A. B. PAUL.

SELF-DISCHARGING PULVERIZING-BARRELS FOR ORES.

No. 7,794. Reissued July 17, 1877.

Witnesses

Geo. H. Strong

Owen F. Stacy

Inventor

Almarin B. Paul

By his Atty's

Dewey & Co

UNITED STATES PATENT OFFICE.

ALMARIN B. PAUL, OF SAN FRANCISCO, CALIFORNIA.

IMPROVEMENT IN SELF-DISCHARGING PULVERIZING-BARRELS FOR ORES.

Specification forming part of Letters Patent No. 102,857, dated May 10, 1870; Reissue No. 7,794, dated July 17, 1877; application filed March 29, 1877.

*To all whom it may concern:*

Be it known that I, ALMARIN B. PAUL, of the city and county of San Francisco and State of California, have invented an Improvement in Self-Discharging Pulverizing-Barrel; and I do hereby declare the following to be a full, clear, and exact description thereof, reference being had to the accompanying drawings.

My invention relates to certain improvements in what is known as the pulverizing-barrel, a device which has long been known and used for pulverizing quartz and other substances.

Before my invention the barrel or cylinder in which the pulverizing was accomplished was made plain, both inside and out, and the substance to be pulverized was placed in the barrel along with metal weights, which served as pounders and grinders to crush and grind it when the barrel was rotated.

My invention consists in introducing in the shell or body of the cylinders, wherever convenient and appropriate, discharging-screens, either wire-cloth or perforated plate, as desired, and in the arrangement of strong metal guards inside of the cylinder over said screens, upon and over which the ore or other substance will move when the barrel is rotated. These guards serve a double purpose; first, to protect the screens from injury from the substance which is being treated; and, secondly, to provide a drop at the termination of the guard, which will aid in the pulverization, all as hereinafter more fully described.

Figure 1:
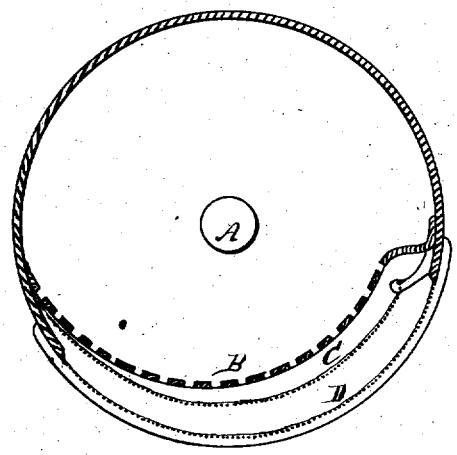
Figure 2:
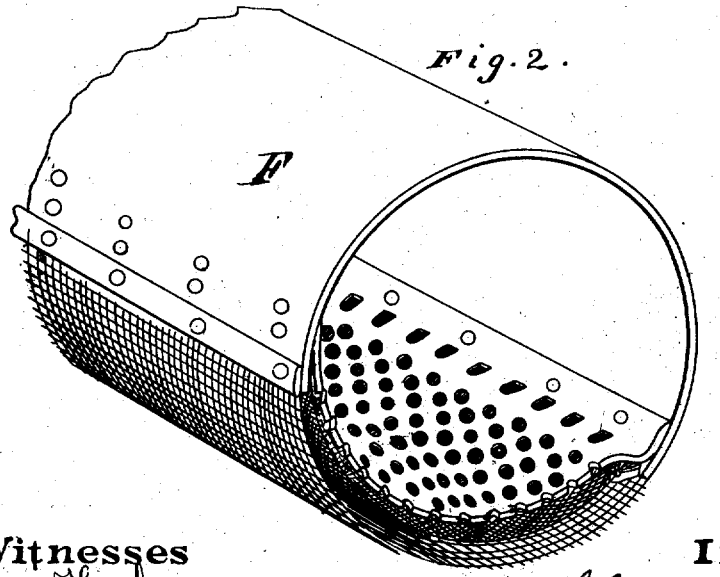

Referring to the accompanying drawings, Figure 1 is a transverse section, and Fig. 2 an interior perspective of the same.

F is the barrel or cylinder, which is suspended axially upon hollow trunnions A, through which the quartz or other substance to be pulverized is introduced into it. In the body or shell of the barrel or cylinder I make openings at suitable points, which extend the whole length of the cylinder, and over each of these I secure one or more screens or sieves, C D, which can be made of wire-cloth or perforated plate, having the desired fineness of mesh.

These screens conform to the cylindrical shape of the cylinder or shell, so as to form a part of the barrel.

To protect the screens from being injured by the quartz or other substance, I secure a shield or guard, B, inside of the barrel, so that it will entirely cover them. This shield or guard may be made of perforated metal or other strong skeleton work or frame, which will withstand the wear occasioned by the pounding and friction of the substance under treatment.

The guard or shield I attach eccentrically to the shell of the barrel near one edge of the screen or screens, in such a manner that it will extend over and across the screen, its opposite or free extremity or edge being carried by the eccentricity a short distance above the screens, thus providing a gradually-increasing width of space between it and the screen underneath, extending from its attached to its free end.

A tight case may inclose the barrel, to confine and collect the dust which is discharged through the screens.

The hopper or hoppers for supplying the material to be pulverized being elevated, and the conductors leading therefrom through the hollow trunnions of the barrel, the material will pass by gravity into the barrel, thus providing an automatic feed.

I shall use this pulverizing-barrel more especially for pulverizing quartz rock and gold-bearing ores, and instead of using metal weights or pounders in the cylinder I may use nothing but quartz rock, the friction and erosive action of one piece against another being quite sufficient to produce the desired pulverization in a very effective and speedy manner without the accompanying disadvantage of tainting the pulp with the particles of iron which are worn off by friction when iron weights are used.

Having thus described my invention, I claim—

1. The combination, with a pulverizing-barrel, of screens C D, one or more, arranged in its sides, and protected by shields B, constructed and arranged to operate substantially as and for the purpose above set forth.

2. The pulverizing-barrel F, provided with discharging-screens B C D, constructed and operating as herein described, and with hollow trunnions A, for the introduction of material to be treated substantially as above specified.

In witness whereof I have hereunto set my hand and seal.

ALMARIN B. PAUL. [L. S.]

Witnesses:

O. T. STACY,

JNO. W. DENT.